United States Patent Office 2,811,470
Patented Oct. 29, 1957

2,811,470

STABILIZED WOOD AND A METHOD FOR ITS PRODUCTION

Duane L. Kenaga, Midland, Mich., assignor to The Dow Chemical Company, Midland, Mich., a corporation of Delaware No Drawing. Application May 31, 1956,
Serial No. 588,254

7 Claims. (Cl. 117—147)

This invention relates to stabilization of wood and other natural and artifically formed lignocellulosic materials and more particularly to a wood product stabilized against dimensional change and a method for producing such product.

It is well known that materials made up entirely or predominantly of cellulose fibers expand and contract with variations in humidity in the ambient atmosphere. In wood, such swelling and shrinking is accompanied by warping and checking. These properties are particularly undesirable when wood is used as a structural material. Wood and other cellulosic materials undergo an increase in dimension upon absorption of moisture from the atmosphere and a contraction when moisture is given up to the atmosphere upon a decrease in the humidity thereof. The increase in swelling occurs until a moisture content of between 28 and 30 percent is reached. This moisture content is known as the "fiber-saturation point." Below the fiber-saturation point the water enters the fine capillary structure of the cell walls and affects the dimensions of the wood. Above this moisture content the water enters the cell cavities or the coarse capillary structure. The water present in the coarse capillary structure of the wood is called "free water" and does not affect the swelling and shrinking under normal conditions.

Stabilization of wood against dimensional changes have been attempted heretofore with only limited success. Three general methods are employed: (1) coating, (2) deposition of bulking agents in the cell walls, and (3) providing cross-links between the cellulose molecules, thereby reducing the degree to which wood can swell. An example of the cross-linking method of dimensional stabilization is the treatment of wood with formaldehyde. By a reaction between formaldehyde and the hydroxyl groups of the cellulose molecules the latter are linked together by cross-bridges or acetal linkages. One of the principal disadvantages of the formaldehyde treatment is that anhydrous conditions and high concentrations of very corrosive mineral acids are required as catalysts resulting in extensive hydrolytic degradation of the wood.

The bulking method of wood stabilization is a method of providing dimensional stability by reducing the shrinkage of swollen wood. It is a process whereby a substance which can be made to diffuse into the intimate structure of the cell walls is employed to reduce the shrinkage, generally by the amount of volume of the substance deposited in the walls. Dimensional stability is thus due to replacement of some of the water within the swelling structure by the added material. Known bulking methods of wood stabilization include acylation in the presence of pyridine catalyst and treatment with resin. In the first method, wood is swelled beyond its green state by means of pyridine and then subjected to vapors of an anhydride such as acetic or butyric anhydride in the absence of moisture. This procedure requires long periods of time for gaseous diffusion making impractical the treatment of wood in large cross section. Another bulking method is the resin treatment of wood wherein the unpolymerized resin is permitted to diffuse into the cell walls and the treated wood heated to polymerize the resin within the cell walls to form an irreversible compound. This treatment, however, changes the physical properties of wood, notably resiliency and shock resistance. Furthermore, resin treated wood is very heavy and very hard. The resin process is also disadvantageous from the treatment standpoint in that it is only practicable for veneer or plywood.

It is an object of this invention to provide a method for the dimensional stabilization of wood and other lignocellulosic materials. A further object is to provide a method for reducing the shrinkage of wood. A still further object is to provide wood resistant to warping and checking. Other objects will become evident from the following specifications and claims.

In accordance with the present invention, it has been found that effective dimensional stabilization of wood and other lignocellulosic materials can be obtained by treatment thereof with a phthalaldehydic acid compound, and under conditions whereby a significant proportion of the phthalaldehydic acid compound is retained in the lignocellulosic structure by reaction with the cellulosic constituent or otherwise. The resulting wood product containing from 10 to 65 percent by weight of phthalaldehydic acid in the form of an association product with the lignocellulosic structure is found to be stabilized against dimensional changes, warping and checking resulting from affects of moisture. Although the amount of phthalaldehydic acid product desirable in the wood structure will vary with the intended use of the stabilized material, the presence of 15 to 30 percent by weight of the acid is considered preferable for a useful product.

The term "phthalaldehydic acid" refers to a compound having the structure

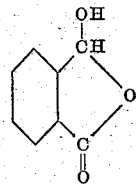

but is inclusive of the compound having the structure often represented in the literature as having the formula

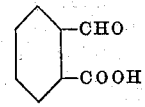

Where the term "phthalaldehydic acid" is herein employed it is to be construed as inclusive of phthalaldehydic acid containing one or more chlorine or lower alkyl radicals substituted in the aryl portion of the acid molecule. The expression "lower alkyl" includes alkyl radicals containing from 1 to 4 carbon atoms, inclusive.

By employing the treatment of the present invention, wood may be dimensionally stabilized or made resistant to swelling and shrinking without altering greatly its physical properties. Furthermore, anhydrous conditions are not required in carrying out this process. These compounds may be applied to wood from aqueous solutions as well as from organic solvent solutions and provide a degree of stabilization or reduction in swelling of from about 30 to about 80 percent. The percent reduction in swelling depends in part on the weight of phthalaldehydic acid retained by the wood. As much as 65 percent of the dry weight of wood has been incorporated. When the tangential reduction in swelling is compared with the percent retention of phthalaldehydic acid, it is found that the increase in tangential reduction is rapid until phthalaldehydic acid in an amount of 20 to 30 percent of the dry weight of wood is retained therein. Thereafter, the rate of increase in the tangential reduction in swelling is not as great. The terms "tangential" and "tangential direction" as herein employed refer to the circumferential direction or the direction of the ring as is the common practice in wood technology. Measurements were made in the tangential direction since it is well established that wood shrinks much more in the tangential direction than in the radial direction. This unequal shrinkage is the cause for the distortions in shape, warping, checking and splitting encountered in wood and wood products.

In accordance with this invention, wood or wood product is immersed in a solution of a phthalaldehydic acid to permit penetration of the latter into the cellular structure of the wood. This immersion or steeping step may be conducted at atmospheric, reduced or increased pressures, and at room temperature or slightly elevated temperatures. A temperature range of from 15° to 85° C. gives good results, although somewhat higher and lower temperatures may be employed. The treating compound is applied generally from aqueous solution but solutions in an organic solvent may be employed. Suitable organic solvents include those which swell wood such as pyridine and dimethylformamide, and those which have little or no swelling effect such as methyl isobutyl ketone. Mixtures of solvents such as a 50:50 mixture of propylene glycol methyl ether and water may also be employed as carriers for the phthalaldehydic acid compound.

The concentration of phthalaldehydic acid in the treating solution will depend in part on the solubility of phthalaldehydic acid in a given solvent at a given temperature. Generally, a 20–35 percent solution has been found to be convenient, although any suitable concentration may be employed.

The preferred conditions of treatment will depend on the particular wood or wood product, the dimensions thereof, and other factors. After an immersion period in the treating solution, the wood is "cured" by exposure to elevated temperatures for a suitable period of time to bring about a reaction, bonding, or other association between the treating compound and the wood so that a significant proportion of the phthalaldehydic acid compound is retained within the lignocellulosic structure. In selecting a suitable curing time, factors are considered such as the temperature of treatment, the solvent in which the immersion step was conducted, whether or not the wood had previously been conditioned in any other way, and the heating means to be employed.

It is necessary in the successful practice of this invention that the phthalaldehydic acid enter the fine capillary structure of the cell walls bringing it into intimate contact with the lignocellulosic component of the wood. This may be achieved by swelling the wood during the impregnation step by treating with a solution of phthalaldehydic acid in a swelling solvent and then curing, or by impregnating the wood with phthalaldehydic acid in a non-swelling solvent and curing with vapors of a solvent, such as steam or dimethylformamide, which both swells wood and dissolves phthalaldehydic acid. Good results may be obtained by conducting the curing step at temperatures of 95°–160° C. for from 0.5 to 24 hours, depending upon pre-treatment and curing methods employed. In certain instances, some increase in degree of stabilization may be achieved by extending the curing time to 72 hours.

The curing treatment may be carried out by any suitable means, such as oven heating, steam heating, electronic heating and vapor heating. Prior to or concurrently with the curing step, free water may be removed from the immersion treated wood. This may be accomplished by such means as heating the wood in a high humidity cabinet or contacting with hot vapors of water-immiscible, non-reacting organic compounds.

After the curing step, the wood is leached with water to remove unassociated acid and then dried. The result of this series of operations is that significant residues of a phthalaldehydic acid are reacted with or in some manner associated with and retained in the wood structure, imparting thereto the property of resistance to dimensional change as normally resulting from variations in humidity.

In the practice of the invention, wood may be subjected to a preliminary treatment with acidic materials such as sulfur dioxide prior to treatment with the phthalaldehydic acid compound. The acidic material so deposited in the wood structure appears to act as a catalyst in phthalaldehydic acid treatment, since by such techniques the curing time may be reduced from 20–24 hours to as little as 4 hours.

In one procedure for testing treated wood to determine the effectiveness of the stabilization treatment, air-dried pieces of Ponderosa pine sapwood are weighed and accurately measured in the tangential direction. The wood pieces are then impregnated with the phthalaldehydic acid compound by soaking at an appropriate temperature and pressure in an aqueous phthalaldehydic acid solution. The wood pieces are removed from the steeping medium and dried in a high humidity cabinet maintained at 80° F. and 85 percent relative humidity to remove free water. The dried wood is then cured by heating in an oven at the curing temperature. The cured wood pieces are then leached in running distilled water until the pH of the leach water is approximately the same pH as that of untreated concurrently leached controls, to remove unassociated phthalaldehydic acid. The leached wood pieces are blotted dry, measured along the tangential direction, oven-dried at 95°–100° C., re-weighed and re-measured. From the difference in the dried weights before and after treatment with phthalaldehydic acid the percent phthalaldehydic acid in the treated wood is determined. From the difference in tangential dimensions of the treated soaked wood and the treated oven-dried wood the percent swelling of the treated wood is determined. Similar measurements are made on untreated wood. From the data, the degree of dimensional stabilization or reduction in swelling is calculated according to the following equation Anti-shrink Efficiency or Percent reduction in swelling = 
$$\frac{\text{Percent swelling of untreated wood} - \text{Percent swelling of treated wood}}{\text{Percent swelling of untreated wood}}$$

If the wood pieces are to be pre-treated with a gaseous acidic catalyst such as sulfur dioxide, they are allowed to stand in the sulfur dioxide atmosphere for a time sufficient for the acid vapors to diffuse into the wood. The time of standing will depend on the size and cross section of the wood to be treated. In the case of wood blocks measuring 1.5 inches x 2 inches x 0.25 inch, 18 hours exposure to sulfur dioxide accomplishes a satisfactory penetration of the wood. Thereafter, the wood is placed in a solution of a phthalaldehydic acid compound and treated as previously described.

In a variation of the method for treating wood with a phthalaldehydic acid compound, the wood is immersed in a solution of the phthalaldehydic acid as before, and is then transferred therefrom into a chamber through which hot inert organic vapors such as xylene and toluene are passed to effect simultaneous water removal and curing. A vapor temperature range of from 105°–160° C. is desirable. This treatment is carried out for a time sufficient to remove water and effect curing. Usually 1 to 9 hours is adequate depending upon the size and cross section of the wood. Thereafter, the treating solvent may be vaporized out of the wood and recovered, if desired.

The phthalaldehydic acid compound may be applied from an organic solvent which swells wood such as pyridine. In such process, the wood is immersed in the organic solvent solution of the phthalaldehydic acid compound. Conveniently, the wood is subjected to reduced pressure conditions before immersion in the treating solution. The wood is then removed from the solution and the solvent vaporized therefrom and recovered, if desired. The wood is then cured and dried as previously described.

When a phthalaldehydic acid is applied from a non-swelling or essentially non-swelling organic solvent such as methyl isobutyl ketone, the treated wood is cured by exposure to vapors of a wood swelling solvent in which phthalaldehydic acid is soluble, such as steam, for from 0.5 to 2 hours followed by the usual drying step.

The following examples illustrate the invention but are not to be construed as limiting.

EXAMPLE 1

Clear Ponderosa pine sapwood wafers or blocks measuring 1.5 inches x 2 inches x 0.25 inch were weighed and accurately measured along the tangential direction. Certain of these wafers were immersed in an aqueous solution of phthalaldehydic acid at 80° C. while others were kept as controls. Five of the blocks were allowed to remain immersed for 4 hours while others were allowed to stand immersed for 24 hours. The wafers so treated were slowly dried at 80° F. and 85 percent relative humidity. The wafers were then cured by heating in a dry oven at 95°–100° C. for 24 hours. Following the curing, the treated blocks and the control blocks were leached in distilled water for 3 to 4 days until the pH of the leach water was the same as that of the controls (about 4.5), the blocks then removed, blotted dry, and measured while in the swollen condition. The wafers were then dried at 95°–100° C. (dry heat) for 24 hours, and thereafter measured and weighed. From the data obtained, the percent reduction in swelling and percent retention of phthalaldehydic acid were calculated. The results are summarized in the following table.

In calculating the percent phthalaldehydic acid in the treated wafers, corrections for air-dried weight were made from the determinations of the moisture content in air-dried samples of controls according to the equation $$D = \frac{100W}{100+M}$$

wherein D is the oven-dried weight, W=air-dried weight and M is the percentage of moisture in the sample based on oven-dried weight, as more fully discussed on pages 23–24, in the "Textbook of Wood Technology," volume II, by H. P. Brown, A. J. Panshin, and C. C. Forsaith, McGraw-Hill Book Company, Inc., 1952.

EXAMPLE 2

Ten air-dried blocks of Ponderosa pine sapwood of the same size as those used in Example 1 were weighed and measured along the tangential direction, placed in a desiccator and the latter evacuated. Gaseous sulfur dioxide was admitted into the desiccator and allowed to penetrate the wood. After standing 18 hours in sulfur dioxide atmosphere the blocks were removed and immediately placed in a 25 percent aqueous solution of phthalaldehydic acid at a temperature of 80° C. On immersing the blocks in the treating solution, evolution of gas was noted. Five blocks were removed after 4 hours immersion and 5 other blocks removed after 22 hours. The blocks were placed in a cabinet maintained at 85 percent relative humidity and 80° F. to remove excess water and thereafter cured by dry-heating at 95°–100° C. for 24 hours. The blocks were then leached with running distilled water for 3–4 days to a constant pH of 4.5, then removed therefrom and the tangential dimensions measured. Thereafter, the blocks were dried at 95°–100° C. for 24 hours, and then measured and weighed. Similarly, six control blocks were weighed and measured, leached and measured, dried at 95°–100° C. for 24 hours, measured and weighed. From the data obtained, the percent reduction in swelling and percent retention of phthalaldehydic acid were calculated.

*Table 1*

| Sample | Treating Time (hours) | Tangential Dimensions (in inches) | | Percent Dimensional Change (Swelling) | Antishrink Efficiency | Oven Dried Weight of Treated Sample (in grams) | Corrected Oven Dried Weight of Untreated Sample (in grams) | Percent Phthalaldehydic Acid in Wood |
|---|---|---|---|---|---|---|---|---|
| | | Swollen | Oven-Dried | | | | | |
| 1 | 20 | 2.162 | 2.097 | 3.10 | 62.3 | 7.065 | 5.090 | 38.8 |
| 2 | 20 | 2.158 | 2.103 | 2.62 | 68.2 | 7.045 | 5.030 | 40.0 |
| 3 | 20 | 2.157 | 2.095 | 2.96 | 64.0 | 7.045 | 5.220 | 34.9 |
| 4 | 20 | 2.155 | 2.098 | 2.72 | 66.8 | 7.175 | 5.130 | 39.9 |
| 5 | 20 | 2.164 | 2.125 | 1.84 | 77.7 | 7.370 | 5.080 | 45.0 |
| 6 | 20 | 2.131 | 2.045 | 4.21 | 48.8 | 6.485 | 5.110 | 27.0 |
| 7 | 20 | 2.136 | 2.063 | 3.54 | 57.0 | 6.430 | 4.960 | 29.6 |
| 8 | 20 | 2.125 | 2.053 | 3.51 | 57.3 | 6.460 | 5.010 | 29.0 |
| 9 | 20 | 2.135 | 2.050 | 4.15 | 49.6 | 6.545 | 5.130 | 27.6 |
| 10 | 20 | 2.141 | 2.075 | 3.18 | 61.3 | 7.035 | 5.120 | 37.4 |

| Controls | Tangential Dimensions (in inches) | | Percent Dimensional Change (Swelling) | Air-Dried Weight (in grams) | Oven-Dried Weight (in grams) | Moisture Content (in grams) | Percent Moisture Content |
|---|---|---|---|---|---|---|---|
| | Swollen | Oven-Dried | | | | | |
| 1 | 2.121 | 1.956 | 8.34 | 5.465 | 5.085 | 0.380 | 7.47 |
| 2 | 2.115 | 1.955 | 8.19 | 5.610 | 5.205 | 0.405 | 7.78 |
| 3 | 2.120 | 1.956 | 8.38 | 5.490 | 5.125 | 0.365 | 7.13 |
| 4 | 2.117 | 1.959 | 8.07 | 5.430 | 5.055 | 0.375 | 7.41 |
| 5 | 2.119 | 1.960 | 8.12 | 5.625 | 5.235 | 0.390 | 7.45 |
| Average | | | 8.22 | | | | 7.45 |

Table 2

| Sample | Treating Time (hours) | Percent Dimensional Change (Swelling) | Anti-shrink Efficiency | Percent Phthalaldehydic Acid in Wood |
|---|---|---|---|---|
| 1 | 22 | 2.14 | 74.1 | 58.4 |
| 2 | 22 | 2.09 | 74.6 | 57.8 |
| 3 | 22 | 2.06 | 75.0 | 60.4 |
| 4 | 22 | 1.66 | 79.9 | 62.4 |
| 5 | 22 | 1.66 | 79.9 | 63.3 |
| 6 | 4 | 2.15 | 73.8 | 51.6 |
| 7 | 4 | 2.11 | 74.3 | 49.1 |
| 8 | 4 | 2.30 | 72.0 | 51.4 |
| 9 | 4 | 2.63 | 68.1 | 50.2 |
| 10 | 4 | 4.19 | 49.1 | 30.5 |
| Control (Average of 6) | | 8.22 | | |

Blocks similar to those described in Example 1 were weighed, measured, and then soaked in 25 percent aqueous phthalaldehydic acid maintained at 80° C. for 18–20 hours. At the end of this period, the treated wafers and the weighed and measured controls were transferred to a chamber and hot xylene vapors passed therethrough for 9 hours. This process effected a simultaneous removal of the free water and curing of the wood. Thereafter, the blocks were removed, the xylene vaporized therefrom at room temperature, and finally leached, measured, oven-dried at 95°–100° C. for 16 hours, weighed and measured. The percent reduction in swelling and the percent phthalaldehydic acid in the wood were calculated as follows:

Table 3

| Sample | Percent Swelling | Percent Reduction in Swelling | Percent Phthalaldehydic Acid in Wood |
|---|---|---|---|
| A | 4.98 | 38.1 | 18.9 |
| B | 5.53 | 31.3 | 12.6 |
| C | 4.80 | 40.3 | 17.1 |
| D | 4.88 | 39.4 | 17.0 |
| E | 4.98 | 38.1 | 19.2 |
| F | 4.46 | 44.6 | 20.4 |
| G | 5.23 | 35.0 | 16.8 |
| H | 4.47 | 40.7 | 19.4 |
| Controls: | | | |
| 1 | 8.37 | | |
| 2 | 8.06 | | |
| 3 | 7.90 | | |
| 4 | 8.00 | | |
| 5 | 7.95 | | |
| Average | 8.05 | | |

EXAMPLE 4

Blocks as described in Example 1 were treated with solutions of phthalaldehydic acid in organic solvents. Certain of these were then subjected to dry-curing and certain others to steam-curing. In this operation, the pine sapwood blocks were placed under reduced pressure of 9 inches of mercury for 10 minutes and then, while maintaining the system under reduced pressure, immersed in a 30 percent solution of phthalaldehydic acid in the organic solvent for about 2 hours. The blocks were then removed and allowed to stand overnight in the hood. Certain of the blocks were then cured by dry-heating for 20 hours at 95°–100° C. Control blocks were also heated for the same period of time. Others were cured by steaming at atmospheric pressure for 30 minutes. Control blocks were similarly treated. The blocks were then leached, measured, oven-dried and re-measured. The results are summarized below:

Table 4

| Sample | Solvent | Cure Method | Percent Swelling | Percent Dimensional Stability |
|---|---|---|---|---|
| A | pyridine | dry | 3.42 | 57.5 |
| B | do | steam | 3.74 | 53.4 |
| C | do | do | 3.93 | 51.0 |
| D | do | do | 3.56 | 55.6 |
| E | methyl isobutyl ketone | dry | 5.80 | 27.9 |
| F | do | steam | 3.58 | 35.4 |
| G | do | do | 3.63 | 54.8 |
| Controls: | | | | |
| Average of 6 | | dry | 8.04 | |
| Do | | steam | 8.03 | |

EXAMPLE 5

Ponderosa pine sapwood wafers as described in Example 1 are measured along the tangential direction. Certain of these are then immersed overnight in a 30 percent aqueous solution of 5-chlorophthalaldehydic acid having a melting point of 122°–124° C. and a molecular weight of 184.5, maintained at 80° C., while others are kept as controls. Thereafter, the impregnated wafers are cured by dry-heating at 100° C. for 20 hours. The treated wafers and controls are then leached in distilled water until the pH of the leach water from the treated wafers and controls are the same. The wafers are then measured, oven-dried, and re-measured. The treated wafers undergo much less dimensional change on drying than untreated wafers.

EXAMPLE 6

Ponderosa pin sapwood wafers as described in Example 1 are measured along the tangential direction. The wafers are immersed for about 15 hours at 80° C. in a 30 percent aqueous solution of 5-tertiary-butylphthalaldehydic acid having a molecular weight of 206. The impregnated wafers are cured by steaming at atmospheric pressure. Several additional wafers employed as controls are also measured and steamed. The treated wafers and controls are then leached to a constant pH. The wafers are measured, oven-dried, and re-measured. The differences between the dimensions in the swollen state and that the dried state is less in the treated wafers than in the controls.

I claim:

1. A process for the dimensional stabilization of lignocellulosic materials which comprises (a) impregnating the lignocellulosic material with a phthalaldehydic acid compound selected from the group consisting of phthalaldehydic acid and phthalaldehydic acid substituted in the aryl portion of the acid molecule with at least one of the group consisting of chlorine and lower alkyl radicals, (b) swelling the lignocellulosic material with a liquid swelling agent and (c) curing the impregnated material by heating while in the swollen condition to the reaction temperature of said phthalaldehydic acid compound with the lignocellulosic structure, wherein the impregnation is effected at least as soon as the swelling step.

2. A process for the dimensional stabilization of wood which comprises (a) impregnating wood with a solution of phthalaldehydic acid, (b) swelling the wood with a wood swelling liquid, and (c) curing the impregnated wood while in the swollen condition by heating to the reaction temperature of phthalaldehydic acid with the lignocellulosic structure, wherein the impregnation is effected at least as soon as the swelling step.

3. A method according to claim 2 wherein the impregnating solution contains from 20 to 35 percent phthalaldehydic acid.

4. A process for the dimensional stabilization of wood which comprises (1) immersing the wood in a solution of phthalaldehydic acid in a wood swelling solvent (2) removing the wood therefrom and (3) heating the treated wood at a temperature of at least 95° C. to bring about an association of the phthalaldehydic acid with the wood.

5. A process for the dimensional stabilization of wood which comprises (1) immersing the wood in a solution of phthalaldehydic acid in a solvent which does not significantly swell the wood, (2) removing the wood therefrom and (3) heating the treated wood at a temperature of at least 95° C. with vapors of a wood-swelling, phthalaldehydic acid dissolving solvent to bring about an association of the phthalaldehydic acid with the wood.

6. An improved wood product stabilized against dimensional change comprising wood impregnated with phthalaldehydic acid and containing from 10 to 65 percent by weight of phthalaldehydic acid in the form of an association product with the lignocellulosic structure.

7. An improved wood product stabilized against dimensional change comprising wood impregnated with a phthalaldehydic acid compound selected from the group consisting of phthalaldehydic acid and phthalaldehydic acid substituted in the aryl portion of the acid molecule with at least one of the group consisting of chlorine and lower alkyl radicals, and containing from 10 to 65 percent by weight of said phthalaldehydic acid compound in the form of an association product with the lignocellulosic structure.

References Cited in the file of this patent

UNITED STATES PATENTS

| | | |
|---|---|---|
| 1,697,248 | Lauter | Jan. 1, 1929 |
| 2,047,946 | Austin et al. | July 21, 1936 |
| 2,591,768 | Austin | Apr. 8, 1952 |
| 2,650,893 | Walker | Sept. 1, 1953 |